J. W. YOCUM.
BOX.
APPLICATION FILED JULY 19, 1920.
1,362,659.
Patented Dec. 21, 1920.
2 SHEETS—SHEET 1.
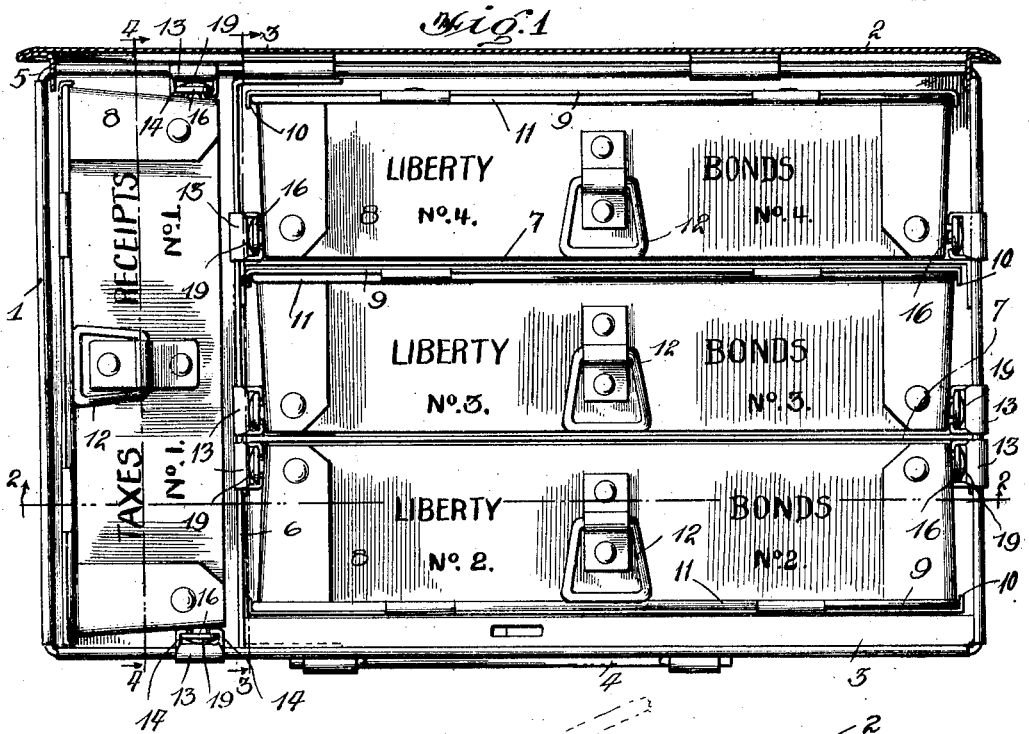
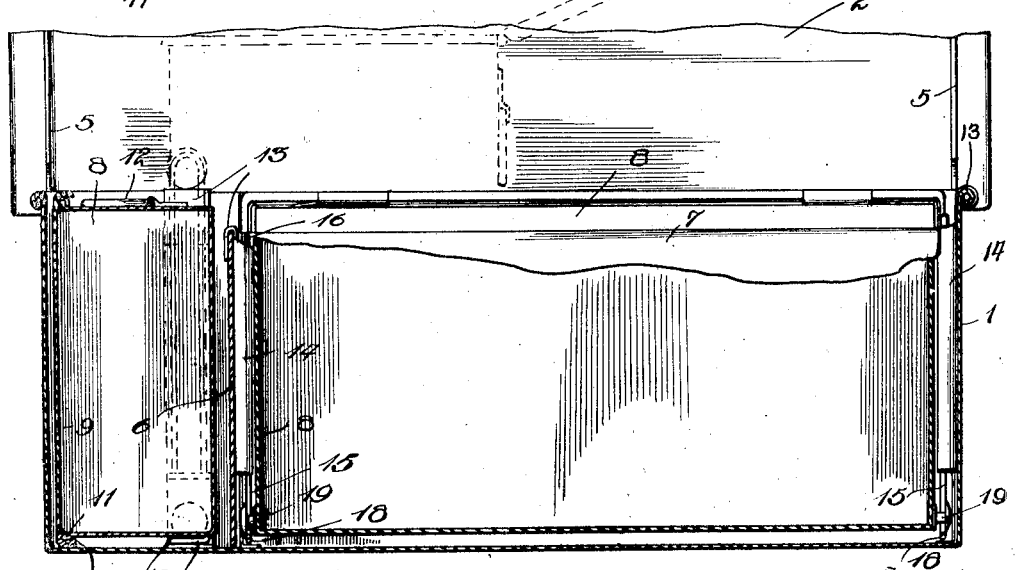
Inventor
J. W. Yocum
By
Lacey & Lacey, Attorneys

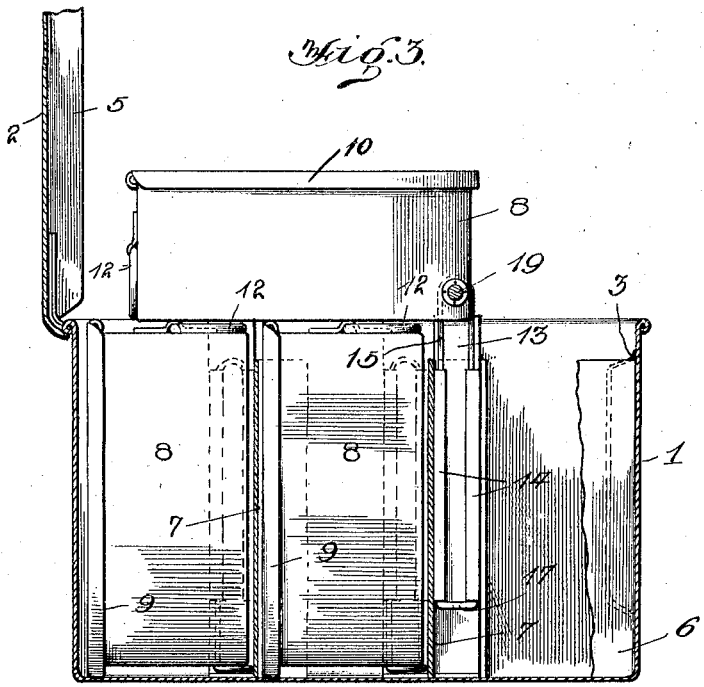
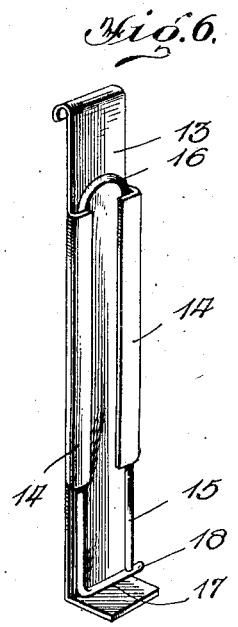
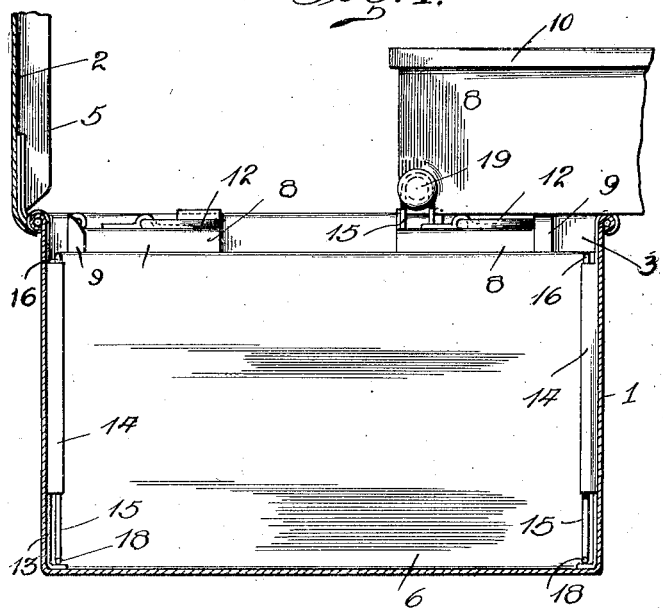
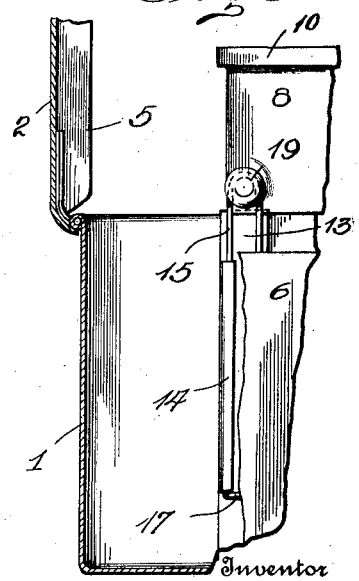

UNITED STATES PATENT OFFICE.

JOHN W. YOCUM, OF WETUMKA, OKLAHOMA.

BOX.

1,362,659.	Specification of Letters Patent.	Patented Dec. 21, 1920.

Application filed July 19, 1920. Serial No. 397,176.

*To all whom it may concern:*

Be it known that I, JOHN W. YOCUM, a citizen of the United States, residing at Wetumka, in the county of Hughes and State of Oklahoma, have invented certain new and useful Improvements in Boxes, of which the following is a specification.

This invention relates to boxes for containing valuable papers and records and has for its object the provision of a simple and efficient device by the use of which a large number of records, securities and other valuable papers may be stored in a small compass and in such order that any particular paper may be readily examined when necessary. The invention seeks to provide a device for the stated purpose in which there will be a plurality of containers, any one of which may be readily placed in position to permit examination of its contents without disturbing any other container, the undisturbed containers, or some of them, serving partly as supports for the container which is being used. The invention further seeks to provide a device in which any container may be readily brought into position for use but will be prevented from becoming detached from the outer casing. The invention also seeks to provide novel means for permitting any desired container to be withdrawn from its closed position, and a further object of the invention is to improve generally the construction and arrangement of the parts of a record box to the end that the cost of construction may be reduced while the utility and durability of the device will be increased.

The invention is illustrated in the accompanying drawings and will be hereinafter fully described, the novel features being subsequently pointed out in the appended claims.

In the drawings—

Figure 1 is a plan view of a device embodying my invention, the cover of the outer casing or container being raised and shown in section;

Fig. 2 is a vertical longitudinal section on the line 2—2 of Fig. 1;

Fig. 3 is a transverse section on the line 3—3 of Fig. 1, the front longitudinal container being shown in position to permit examination of its contents;

Fig. 4 is a transverse section on the line 4—4 of Fig. 1, the intermediate longitudinal container being shown in position to permit examination of its contents;

Fig. 5 is a view similar to Fig. 4, but showing the rear longitudinal container withdrawn;

Fig. 6 is an enlarged detailed perspective view of the slidable hinge member.

In carrying out my invention, I employ an outer casing or main container 1 which may be of any desired dimensions and is constructed of sheet metal so that it will be fireproof and durable. This outer casing or main container is preferably rectangular in form and is equipped with a cover 2 hingedly mounted upon the rear wall of the container while on the front wall of the container, on the inner side thereof, is provided a lock 3 which may be of any convenient type. A bail or handle 4 is also provided upon the front wall of the outer container so that when the cover has been swung down onto the body of the container and locked, the entire device may be easily carried from place to place. As clearly shown in the drawings, the cover 2 is preferably provided with a rib or flange 5 on its inner side adjacent its edges which is adapted to fit closely within the container while the edges of the cover will project beyond the walls of the container and the insertion of instruments into the outer container for the purpose of prying off the cover and obtaining unwarranted access to the contents of the box will be prevented.

Across the outer casing or main container 1, adjacent one end thereof, is a transverse partition 6 and extending between the said partition and the more remote end of the casing are a plurality of longitudinal partitions 7, the interior of the casing being thereby divided into a plurality of compartments which are independent of each other and which may be of the same or different dimensions. Within each of the said compartments is fitted an inner container or box 8, which boxes are similar in form and construction and are preferably of metal so that they will be fireproof and durable. Each supplemental container 8 is equipped with a lid or cover 9 hinged at one edge to an edge of one longitudinal wall of the container and so arranged that when the container is placed edgewise within its respective compartment the free edge of the lid will be at the bottom of the compartment, the lid being constructed with an overhanging flange 10 which is adapted to bind upon the edges of the container and thereby be held against accidental opening. To aid in maintaining the engagement of the said flange 10 with the body of the container, the free edges of the container walls are provided with a bead 11, as shown, and which will fit snugly in the angle defined by the lid and its flange. As clearly shown in the drawings, the several inner containers are so arranged in their respective compartments that the lid cannot be swung to open position or pried open until the box or container has been withdrawn from the compartment and the connection between the container and the walls of the compartment are such that the box may be lifted vertically from the compartment but cannot be detached from the outer casing and, when it has cleared the compartment, it will be swung over to rest upon the other containers or the partitions defining the other compartments. To facilitate the withdrawal of the containers from their respective compartments, each container is provided upon its back wall, which is the wall to which the lid is hinged and which will be uppermost when the container is within its compartment, with a small bail or handle 12 which may fold close to the container or which may be readily raised so as to be engaged by the fingers of the user, as will be readily understood. At the opposite ends of each compartment, I provide a bracket 13 having overhanging lips or cleats 14 upon its inner face at its side edges which constitute guideways for a bail or loop 15 slidably fitted thereto. As shown most clearly in Fig. 6, this bail or loop is formed of a single strand of wire doubled upon itself between its ends to provide a curved end portion 16 and having one end portion turned at a right angle, as shown at 17, to extend across and beyond the other extremity, the projecting portion 18 constituting a stop which is adapted to engage the lower end of the corresponding guide 14 and thereby limit the upward sliding movement of the said bail. At each end of each container 8, at the corner diagonally opposite the hinged connection between said container and its lid, I provide a headed stud 19, the shank of which is adapted to pass between the guides 14 and the sides of the bail or loop 15 and the head of which is adapted to extend over the sides of the bail or loop 15 between the same and the body of the bracket 13. As shown most clearly in Fig. 2, when the containers are housed within their respective compartments, the studs 19 will be immediately adjacent the bottoms of the respective compartments. When any container is lifted so as to be withdrawn from its compartment, the stud will ride between the loop 15 and the body of the bracket 13 until the shank of the stud engages the curved upper end of the loop whereupon the continued upward movement of the container will cause the loop to slide through the guides 14 upwardly until the projecting stop 18 of the loop impinges against the lower end of the corresponding guide whereupon the further upward movement of the bail and of the container will be arrested but the container may then be swung in a vertical plane about the stud 19 as a pivotal center and be brought to rest above the other compartments or the other containers, as clearly shown by the dotted lines in Fig. 2 and by Figs. 3, 4 and 5. Upon reference to Fig. 2, furthermore, it will be noted that the opening movement of the lid 9 is in the same direction as the movement of the container in assuming its position over the containers which are not withdrawn.

The device may be arranged to accommodate any desired number of inner containers according to the needs of any particular user and in the present illustration, I have shown the outer casing subdivided into one transverse compartment at one end and three longitudinal compartments extending between said transverse compartment and the opposite end of the casing. Upon reference to Fig. 2, it will be noted that the container in the transverse compartment, when in use, will rest across the ends of the longitudinal compartments while the container in the front longitudinal compartment, after being raised, will swing rearwardly and extend over the longitudinal compartments at the rear. The container in the intermediate longitudinal compartment will be swung forwardly so as to be supported by the front container and be thereby prevented from striking against the cover 2 of the casing. The rear container will be swung forwardly and rest upon the intermediate and the front containers.

From the foregoing description, taken in connection with the accompanying drawings, it will be seen that I have provided a very simple device by which a large number of papers, records, securities or other documents may be safely stored in a small space and may be readily examined when so desired. The several containers will be closely arranged within the outer casing and any one container may be withdrawn without disturbing any of the other containers and while any container may be fully withdrawn from its compartment, it will be prevented, by the engagement of the headed studs on the container and the slidable hinge members coöperating with said studs, from becoming detached from the outer casing. The device may be manufactured at a low cost and will be found efficient as a safety deposit box or as a fireproof carrier for the transportation of valuable records.

Having thus described the invention, what is claimed as new is:

1. A device for the purpose set forth comprising an outer casing, partitions within the casing defining a plurality of compartments, a hinged cover adapted to extend over and close all the compartments and the casing, a plurality of containers each having an open side and a swinging lid to cover said side fitted in one of the compartments with the open side vertical, stud and groove connections between the ends of each container and the ends of the compartment in which it is received, and stops coöperating with said stud and groove connections whereby the container may be raised from the compartment and swung over adjacent compartments and supported by the partitions defining said compartments with its open side uppermost.

2. A device for the purpose set forth comprising an outer casing, vertically disposed loops slidably mounted upon the ends of the casing, both ends of the loops being closed, a container fitted within the casing, headed studs upon the container slidably engaging said loops and adapted to impinge against the ends thereof whereby to raise or lower the loops, the lowering of the loops permitting the loops and the container to be fully housed in the casing, and means for limiting the raising movements of the loops whereby to prevent detachment of the container and permit it to be swung over and supported by the casing.

3. A device for the purpose set forth comprising an outer casing, vertically disposed guides at the ends of the casing, loops slidably fitted in said guides and having closed ends, a container within the casing, headed studs on the ends of the container slidably engaging said loops and adapted to impinge against the ends of the same and thereby impart vertical sliding movement thereto, and stops at the lower ends of the loops adapted to engage the corresponding guides and limit the upward movement of the loops whereby to limit the upward movement of the loops and prevent detachment of the container and permit it to be swung over and supported by the casing.

In testimony whereof I affix my signature.

JOHN W. YOCUM. [L. S.]